Aug. 8, 1967 R. ESKRA ETAL 3,334,443
VEHICLE WINDOW AND REGULATOR ASSEMBLY
Filed Sept. 30, 1965 4 Sheets-Sheet 1
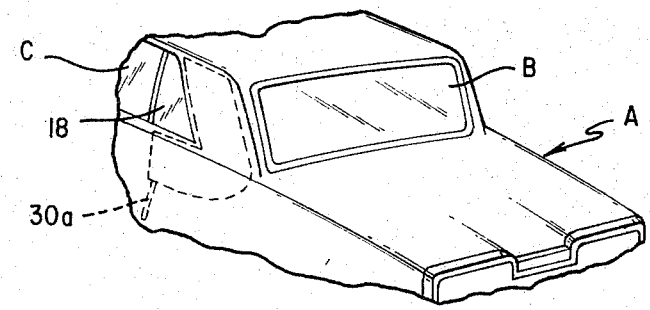
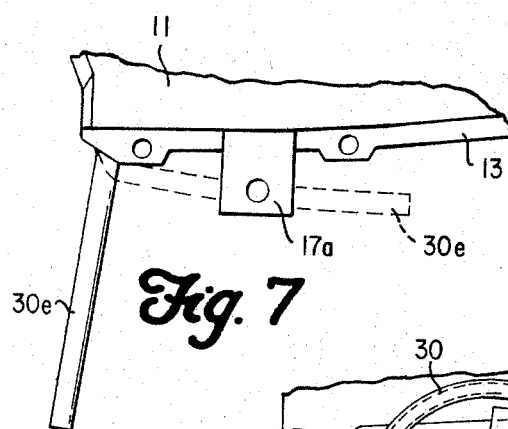
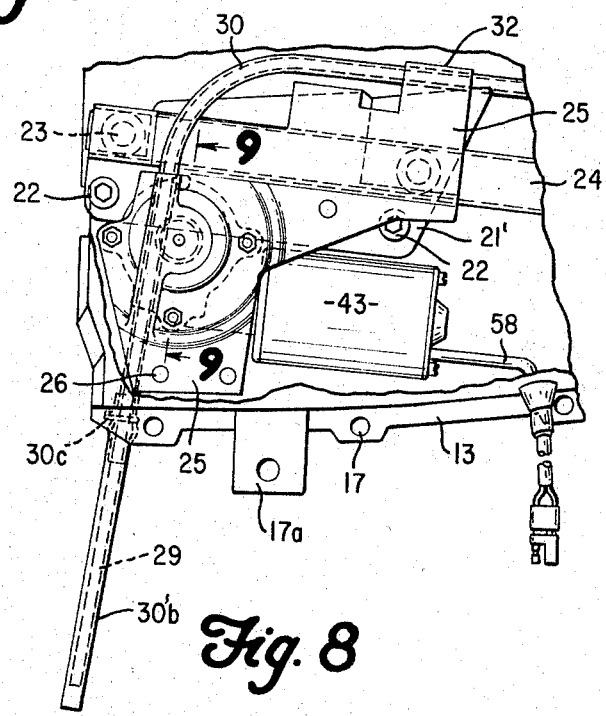
INVENTORS.
RUDOLPH ESKRA
NORMAN A. ROHRBACHER
BY
*Fraser & Fraser*
ATTORNEYS Aug. 8, 1967 R. ESKRA ET AL 3,334,443
VEHICLE WINDOW AND REGULATOR ASSEMBLY
Filed Sept. 30, 1965
4 Sheets-Sheet 2
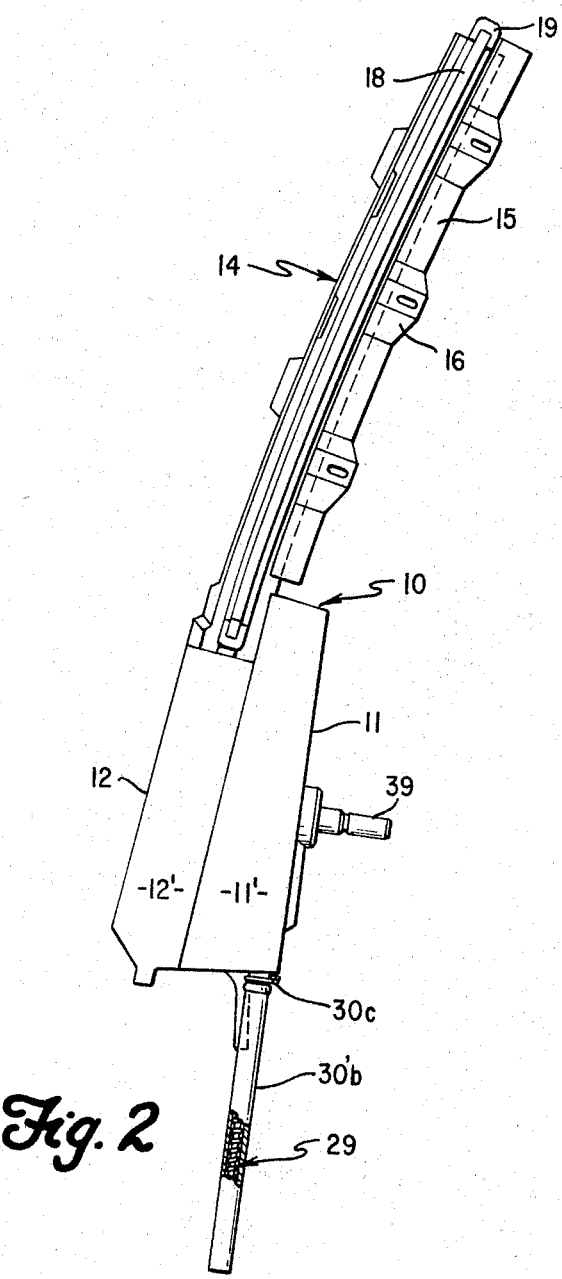
Fig. 2
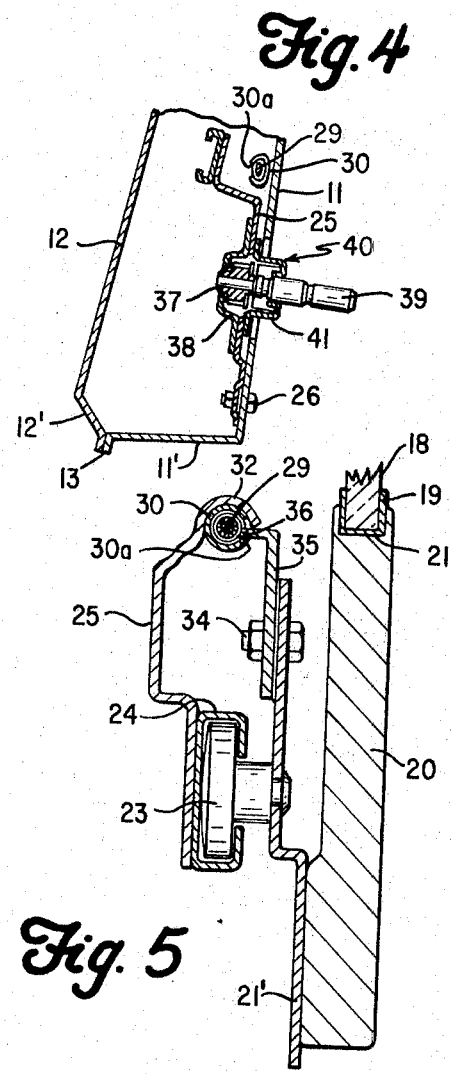
Fig. 4
Fig. 5
INVENTORS.
RUDOLPH ESKRA
NORMAN A. ROHRBACHER
BY
ATTORNEYS

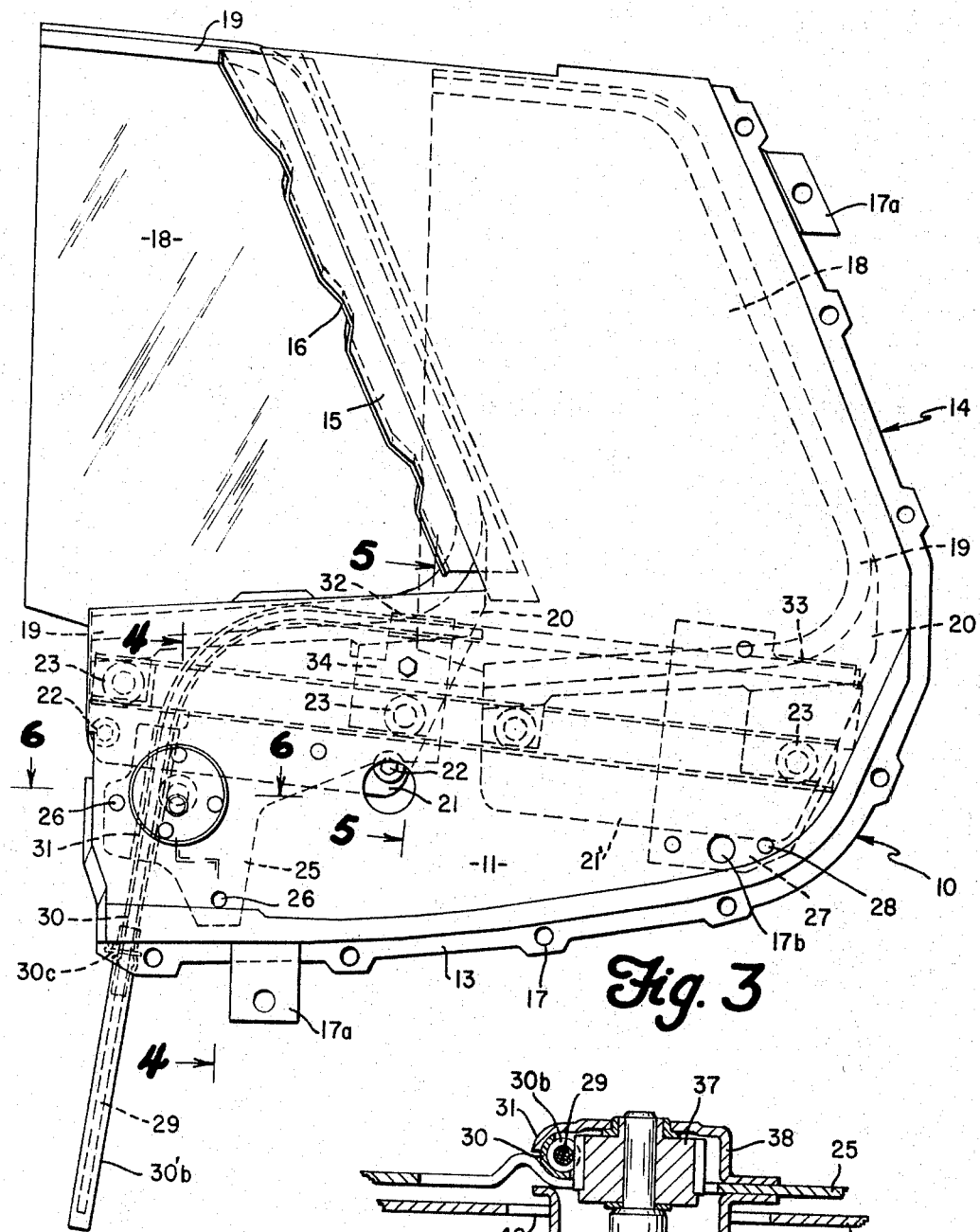

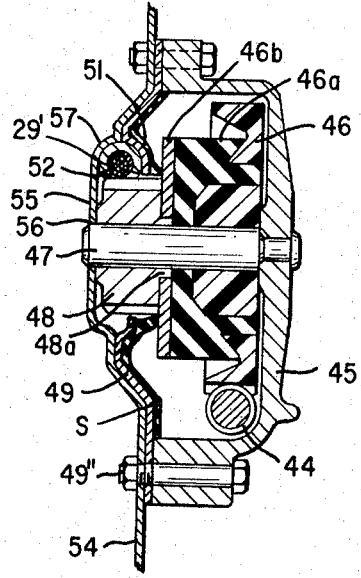
Fig. 9
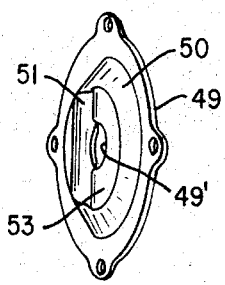
Fig. 10
INVENTORS.
RUDOLPH ESKRA
NORMAN A. ROHRBACHER
BY
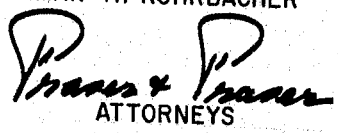
ATTORNEYS United States Patent Office 3,334,443
Patented Aug. 8, 1967

3,334,443
VEHICLE WINDOW AND REGULATOR
ASSEMBLY
Rudolph Eskra, Lambertville, Mich., and Norman A. Rohrbacher, Toledo, Ohio, assignors to Dura Corporation, Oak Park, Mich., a corporation of Michigan
Filed Sept. 30, 1965, Ser. No. 491,729
7 Claims. (Cl. 49—349)

ABSTRACT OF THE DISCLOSURE

A prefabricated window regulator assembly which as a unit can be installed in position of use. The regulator has a rigid longitudinally slotted tube in which a flexible actuating cable shifts translatorily by engagement with a driving pinion. An operative connection is established between one end of the cable and the window so that shifting movement of the cable imparts corresponding window panel movement. A separable tube is removably connected to the slotted tube for receiving an end portion of the cable, whereby for transportation or storage the separable tube can be removed.

Heretofore the window panel and associated parts were mounted in the vehicle body and the regulator mechanism was separately installed on bracket plates disposed in the vehicle. These parts were then operatively connected. This not only required considerable time and labor but adjustments usually were necessary to enable the proper fitting of the parts for achieving easy and normal operation of the regulator and free shifting movements of the window panel. It is a desideratum to simplify this operation, reduce the time, labor and expense of installation and obviate troublesome adjustment problems inherent in such steps.

An object of the invention is to produce a new and improved assembly of a window panel, regulator mechanism and associated parts enabling the same to be installed quickly and conveniently as a package in position of use in a vehicle body, thereby reducing time and labor necessary for installation and affording an assembly free of adjustment problems.

Another object is to produce a simple and efficient assembly having a rear quarter window panel, regulator mechanism for effecting window panel sliding movemens, guide devices for the panel, and a housing containing the parts, so that the assembly constitutes a single package ready for installation in a vehicle body by simply fastening the housing in place.

A further object is to improve and simplify a combined vehicle window panel and regulator mechanism package to render the same easy to install as a unit, simple to operate, and sturdy and reliable in construction to withstand reasonably hard usage in transporting and handling.

A still further object is to produce an improved assembly including a drive pinion, a driven cable and sheath assembly, and associated housing so designed that the members can be economically produced and assembled in quantity production and to achieve sturdy and reliable operative relationship of the moving parts for insuring efficient and satisfactory alignment and coaction.

Other objects and advantages of the invention will hereinafter appear and, for purposes of illustration but not of limitation, embodiments of the invention are shown on the accompanying drawings, in which—

FIGURE 1 is a fragmentary rear perspective of an automobile body indicating the installation of the window panel and regulator package;

FIGURE 2 is an enlarged front end elevation of the unit which includes the regulator mechanism, window panel and associated parts;

FIGURE 3 is a side elevation of the assembly shown in FIGURE 2 and showing by broken lines the window in its rear or retracted position;

FIGURE 4 is a sectional view substantially on the line 4—4 of FIGURE 3, showing particularly the driving pinion;

FIGURE 5 is a sectional view substantially on the line 5—5 of FIGURE 3;

FIGURE 6 is an enlarged sectional view substantially on the line 6—6 of FIGURE 3, showing the driving connection between the pinion and cable;

FIGURE 7 is a fragmentary view of an alternate form of tube for receiving the end portion of the operating cable;

FIGURE 8 is a fragmentary side elevation of an alternate form in which the pinion is driven by an electric motor;

FIGURE 9 is a sectional view on the line 9—9 of FIGURE 8; and

FIGURE 10 is a perspective view of a casing plate used in the assembly shown on FIGURE 8, but on a reduced scale.

Referring to the drawings, FIGURE 1 shows an automobile body A equipped with a rear window panel B and designating a rear quarter window panel 18, which is mounted for horizontal sliding movements to and from a window panel C. As will hereinafter appear, the rear quarter window panel 18 constitutes part of a package or assembly which can be installed as a unit in the automobile body, the same to include the regulator mechanism and guiding devices for the window panel.

Referring particularly to FIGURE 3, a housing which may be termed an operating housing is indicated at 10 and has a sheet metal inner wall or panel 11 and a laterally spaced outer wall or panel 12 (FIGURES 2 and 4). The walls 11 and 12 are formed with integral inwardly extending edge walls 11' and 12', respectively, which extend toward each other, the adjacent edges of which have abutting flanges 13, which may be secured together by bolt and nut assemblies, for example, extending through a series of apertures 17.

Forming a part of the operating housing 10, and disposed thereabove, is what may be termed a window panel housing 14. The housing 14 is integral with the top end of the operating housing and occupies approximately one-half the longitudinal dimension thereof. The rear portion of the window panel housing 14 inclines forwardly and is open only at the front end to permit shifting movement of the window panel from its housed position, in which the window opening is uncovered, to its closed position. Along the front edge of the window panel housing 14 and disposed in a plane parallel to the inclined rear portion is a laterally extending attaching flange 15, which is provided with offset fastener receiving apertured brackets 16 to enable the same to be attached to the vehicle body frame. Suitable attaching brackets 17a may be provided on the housing at spaced points to enable the same to be secured to a vehicle body frame, a bolt-receiving hole 17b being also provided in the housing for this purpose.

The rear quarter window glass panel 18 has three side edges enclosed by a metallic frame 19, which is U-shaped in cross section and between the frame 19 and the glass panel may be a strip of felt, or the like (not shown). As shown, the window frame 19 has a press fit in a groove 21 in the edge of a die-cast window mounting plate 20. On one side of the mounting plate 20 is secured a roller carrying plate 21' by bolts 22. Carried by the plate 21' is a pair of horizontally spaced roller assemblies 23. As the window panel 18 moves back and forth, the rollers 23 roll in a guide channel 24, which, as indicated on FIGURE 3, is of substantial length and covers approximately the entire horizontal dimension of the operating housing 10 enabling the window panel to be shifted between open and closed positions.

The left-hand portion of the guide channel 24 is secured as by welding to a bracket plate 25, which, in turn, is connected by bolt and nut assemblies 26 to the inner housing panel 11. There is a right-hand bracket plate 27 (FIG. 3) to which the roller guide channel 24 is secured, and this bracket plate is secured by bolt and nut assemblies 28 to the inner housing panel 11.

For actuating the window 18, a flexible cable 29 is provided. Linear movement is imparted to the cable 29 in one direction or the other to impart opening or closing shifting movements to the window panel 18. The cable 29 consists of a bundle of parallel wires which are contained and bound together by a helical wire, which is wound outside with the convolutions in spaced fashion about the bundle of parallel wires. As shown, the cable extends through and has translatory sliding movement in a fixed guide sheath 30, which is provided with a longitudinally extending slot 30a. A cable-sheath assembly of this character is old in the art and reference is made to U.S. Patent 3,174,742 granted Mar. 23, 1965, for more detailed description and illustration thereof. For holding the sheath 30 rigidly in place, there is an embossed portion 31 which is crimped over the sheath and a soldered connection 32 between the sheath and the bracket 25. The sheath is also soldered at 33 to a horizontal portion of the bracket plate 27. It will be observed that the sheath 30 is L-shaped to afford a convenient arrangement within the housing.

Secured by bolt and nut assemblies 34 to the roller-carrying plate 21' is a plate 35, which is formed with an in-turned cable-engaging tongue 36. The engagement between the tongue 36 and the cable is such that upon linear movement of the cable 29 the plate 35 is pushed or pulled in one direction or the other depending upon the direction of cable movement and thereby the window 18 is moved in the desired direction. As above indicated, the window is supported and guided by the rollers 23, which travel in free rolling engagement with the channel 24.

Linear movement is imparted to the cable 29 either manually as indicated on FIGURES 1 to 6 or by power means as indicated on FIGURE 8. In either case a pinion 37 is employed, which has teeth in operative engagement with the cable 29 to bear against adjacent convolutions of the helically wound wire and impart the linear movement in one direction or the other. The pinion 37 is disposed within a cup-shaped housing 38, which is suitably fixed to one side of the bracket plate 25. The pinion 37 is mounted on shaft means 39, which projects outside of the housing and may receive a crank handle (not shown) for manual operation. It will be observed that the sheath is continuous and unbroken and extends through the pinion housing 38 where it is retained in place so as properly guide the movements of the cable. To enable the teeth of the pinion 37 to engage the cable 29, a portion of the sheath 30 is broken away for this purpose as indicated at 30b. Associated with the pinion 37 is a clutch or brake unit generally indicated at 40. This is for the purpose of holding the parts in the position of adjustment and resist retrograde movement so that when the crank handle is released the window will remain in its adjusted position. Brake or clutch units of this type are old and well-known in the art and detailed description thereof is not considered necessary. Suffice it to say that such unit is disposed within a housing 41 which is fixed to the opposite side of the bracket plate 25 and projects through a hole 42 in the housing panel 11.

To accommodate the required length of the cable 29 a tube 30'b is detachably connected to the lower end of the sheath 30. The tube 30'b may telescope over the end of the sheath, as shown on the drawing, and is secured in place by a wire clamp 30c. Thus in shipping the unit the tube 30'b may be removed in order that it is not damaged in transit. Manifestly, when the window panel 18 has been shifted to its right-hand position (FIGURE 3) the cable is wholly disposed within the sheath. However, when shifted to the other position the cable will be extended out into the tube 30'b.

Referring to FIGURE 7, a tube 30e is shown to receive the end portion of the operating cable 29 and this tube is clamped or otherwise suitably secured to the end portion of the sheath 30. The tube 30e is of a bendable material, such as polyethylene or other plastic material which together with the associated cable can be bent to the broken line position for transportation or storage purposes. If desired, any suitable holding device, as a clip, may be used to retain the tube in its bent position.

Power means for driving the cable 29 may be employed, if desired, and in this connection a reversible electric motor 43 is shown on FIGURE 8 as being arranged wholly within the lower portion of the housing. On the armature shaft of the motor is a worm 44 (FIG. 9), a portion of which is disposed inside of a flanged cup-shaped case 45 containing a worm wheel 46 of nylon or similar material mounted on a spindle 47. The worm wheel 46 has intimately associated therewith for conjoint rotation a rubber annulus 46a, which is also concentric with the spindle 47 and has bonded to it at its outer side a metal plate 46b. The plate 46b has a polygonal central hole which receives a similar shaped hub 48a on a metal pinion 48. The rubber member 46a serves as a shock absorber in the initial movement of the worm wheel 46 to militate against damage to the associated parts. The pinion 48 rotates on the spindle 47 and is in engagement with a sheathed cable 29' identical with the cable 29 above described. Enclosing the pinion 48 and assisting in guiding the movement of the cable 29' is a cover plate 49 which at its edge portion abuts the flange of the case 45. The plate 49 has a central hole 49' and a curved embossure 50 which is interrupted by a rectilinearly disposed depressed cable-receiving channel 51 disposed substantially tangential to the pinion 48. The depressed channel 51 is curved in cross section as shown in FIGURE 9 and has a slot 52 to enable the cable 29' to engage the teeth of the pinion 48, a flat surface 53 being disposed at the opposite side of the channel 51. Cooperating with the case plate 49 is the outer housing panel 54 which is pressed outwardly and formed with a flat portion 55 against which the side of the pinion 48 abuts, the end of the pinion shaft 47 projecting through and having bearing in the edge of the hole 56 in the flat housing portion 55. Bolt and nut assemblies 49" secure the case 45, plate 49 and panel 54. The flat portion 55 of the housing has a rectilinearly extending curved channel 57 which fits over a portion of the channel 51 for positioning the sheath for the cable 29'. On the underside of the case is a layer S of neoprene or the like, a portion of which is in engagement with the plate 46b to effect a liquid seal.

From the reversible motor 43 extends a cable 58 through a hole in the housing to the outside and within the cable will be the usual wires for switch control of the motor.

From the above, it will be manifest that we have produced an exceedingly practical assembly which can be fabricated and put together and tested at the factory of the supplier. It can then be delivered to the automobile assembly line where it can be installed quickly and without the employing of skilled personnel. Since the package requires but little in the way of adjustment on the job and since all the parts have been previously tried out and tested, there is nothing more for the assembler on the line to do. Consequently, considerable saving in time and effort is effected and a substantial contribution to efficiency is thus made.

Numerous changes in details of construction, arrangement, operation and choice of materials may be effected without departing from the spirit of the invention especially as defined in the appended claims.

What we claim is:

1. A device of the class described comprising a prefabricated unit for installation in a vehicle body, said unit including a housing, means on said housing for attaching same to a vehicle body, a horizontal guide fixedly mounted within said housing, a window panel shiftable in and out of said housing, a frame for said window panel, guide devices carried by said frame within said housing and engaged in said guide for guiding the linear movement of said window frame, regulator mechanism within said housing for imparting movement to said window frame, said mechanism comprising a rigidly fixed longitudinally slotted tube disposed wholly within said housing and having two portions disposed angularly with respect to each other, a flexible actuating cable shiftable translatorily in said tube, said actuating cable being constructed to be drivingly engaged by a pinion, an operative connection between one end portion of said actuating cable and said window panel frame whereby shifting movement of said cable imparts corresponding window panel movement, a pinion within said housing operatively engaging said cable, means for rotating said pinion in one direction or the other, the opposite end portions of said cable extensible outside of said housing, and a separable tube removably connected to said slotted tube for receiving said opposite end portion of said cable, whereby for transportation or storage said separable tube can be removed to prevent damage thereto.

2. A device of the class described comprising a prefabricated unit for installation in a vehicle body, said unit including a housing, means on said housing for attaching same to a vehicle body, a horizontal guide fixedly mounted within said housing, a window panel shiftable in and out of said housing, a frame for said window panel, guide devices carried by said frame within said housing and engaged in said guide for guiding the linear movement of said window frame, regulator mechanism within said housing for imparting movement to said window frame, said mechanism comprising a rigidly fixed longitudinally slotted tube disposed wholly within said housing and having two portions disposed angularly with respect to each other, a flexible actuating cable shiftable translatorily in said tube, said actuating cable being constructed to be drivingly engaged by a pinion, an operative connection between one end portion of said actuating cable and said window panel frame whereby shifting movement of said cable imparts corresponding window panel movement, a pinion within said housing operatively engaging said cable, means for rotating said pinion in one direction or the other, the opposite end portion of said cable extensible outside of said housing, and means for enclosing and protecting said extensible portion of said cable on the outside of said housing.

3. A device of the class described according to claim 2, in which the enclosing and protecting means for the extensible portion of the cable comprises a tubular flexible member which can be swung to a position adjacent the housing for transportation or storage purposes.

4. A device of the class described according to claim 3, in which the tubular flexible member is of non-metallic plastic material.

5. A device of the class described in claim 2 in which said window panel frame comprises a channel member engaging a portion of the edge of the window panel, a plate to which a portion of said channel member is fixed, a second plate fixed to said first plate, roller assemblies carried by said second plate for rolling engagement in the guide, and a tongue member secured to said second plate for engagement with the cable so that movement of the cable is imparted to said tongue member.

6. Operating mechanism for a vehicle window regulator comprising a translatorily shiftable cable having pinion teeth engageable means for effecting movement thereof, a stationary tubular sheath enclosing said cable and defining the path of movement thereof, a support panel having an outwardly extending flat surface, a cup-shaped housing on the inner face of said panel, a case plate interposed between said housing and support panel, attaching means for said housing and case plate, an annular toothed member within said housing, means to drive said toothed member, a spindle for said toothed member supported at its ends in said housing and said support panel, a deformable rubber annulus attached to one side of said toothed member for rotary movement therewith, a plate bonded to the inner face of said rubber annulus and having a polygonal shaped central aperture, a driving pinion at one side of said plate having a laterally extending portion fitting said polygonal hole so that turning movement of said plate is transmitted to said pinion, said pinion being mounted on said spindle, and said sheath being slotted to expose said cable to the pinion teeth, a rectilinearly extending channel on said support panel and curved in cross section to fit an outer portion of said tubular sheath, and a rectilinearly extending depressed channel in said case plate to fit an inner portion of said sheath and cooperate with said first channel in holding the sheath in place and to cause a straight run of the cable in the region of said driving pinion.

7. Operating mechanism as claimed in claim 6 comprising a moisture seal between the inner face of said case plate and said plate to which the rubber annulus is bonded.

References Cited

UNITED STATES PATENTS

| | | | |
|---|---|---|---|
| 3,174,742 | 3/1965 | Stelzer | 49—349 |
| 3,235,248 | 2/1966 | Golde | 49—352 |
| 3,280,509 | 10/1966 | Werner | 49—352 |

DAVID J. WILLIAMOWSKY, *Primary Examiner.*

J. K. BELL, *Assistant Examiner.*